3,655,656
CRYSTALLINE CEPHALEXIN MONOHYDRATE
Earle M. Van Heyningen, Indianapolis, Ind., assignor to
Eli Lilly and Company, Indianapolis, Ind.
No Drawing. Continuation-in-part of application Ser. No.
818,138, Apr. 21, 1969. This application June 4, 1970,
Ser. No. 43,597
Int. Cl. C07d 99/24
U.S. Cl. 260—243 C
2 Claims

ABSTRACT OF THE DISCLOSURE

Cephalexin monohydrate is obtained as dense, large crystals, useful in formulations of the antibiotic, by precipitating cephalexin from an aqueous solution of its salt at a temperature above about 60° C. or by spraying anhydrous cephalexin with excess water and drying to constant weight.

CROSS REFERENCE

This application is a continuation-in-part of my copending application Ser. No. 818,138, filed Apr. 21, 1969, now abandoned.

BACKGROUND OF THE INVENTION

Cephalexin is a generic term used to identify a chemical compound, 7 - (D-α-aminophenylacetamido)-3-methyl-3-cephem-4-carboxylic acid:

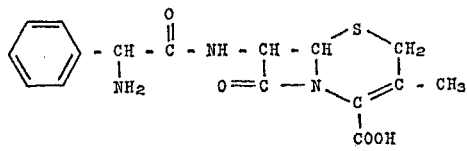

This compound is active as a broad spectrum antibiotic effective in controlling diseases caused by a wide variety of Gram-positive and Gram-negative microorganisms. One of the unique features of this cephalosporin is that it has shown outstanding advantages for use as an oral antibiotic.

Sephalexin is one of the semi-synthetically produced cephalosporins. It can be made, for example, by acylating the cephalosporin nucleus, 7-aminocephalosporanic acid, commonly known as 7–ACA, in an aqueous medium with a mixed anhydride form of D-phenylglycine in which the free amino group has been protected by a suitable blocking group, to form the 7-(D-α-[blocked amino]phenylacetamido)cephalosporanic acid, removing the blocking group by conventional methods to form 7-(D-α-aminophenylacetamido)cephalosporanic acid, and converting the latter compound to the corresponding 3-desacetoxy compound, cephalexin, by hydrogenolysis as for example by the method of Stedman, U.S. Pat. 3,124,576. Alternative methods of effecting the acylation of 7–ACA and the hydrogenolysis of the acetoxy group are well known to those skilled in the art. It is also known that cephalexin can be prepared by a procedure in which the foregoing process steps are reversed, i.e., the cephalosporin nucleus can be hydrogenolyzed to the 3-desacetoxy-7–ACA and then acylated to form the desired cephalexin.

The source material for the 7–ACA employed in the foregoing synthesis is cephalosporin C, more precisely known as 7-(5'-aminoadipamido)cephalosporanic acid, which can be prepared by cultivating a cephalosporin C-producing organism in a suitable nutrient medium as described in British Pat. 810,196, and can then be readily converted into the corresponding nucleus compound, 7-aminocephalosporanic acid, by cleaving the 5'-amino-N'-adipamyl side chain between its amido carbonyl group and its amido nitrogen by known procedures.

An alternative preferred method of preparing cephalexin employs the ring-expansion process of Morin and Jackson, U.S. Pat. 3,275,626. Organic solvents are employed in this process and the cephalexin is usually obtained as a solvate; however, the anhydrous form is sometimes obtained. Such anhydrous or solvated cephalexin possesses the same undesirable characteristics as the anhydrous or solvated cephalexin described in the following paragraph.

Recrystallization of cephalexin, without regard to the method whereby it is produced from organic solvents such as acetonitrile, N,N-dimethylformamide, dimethylsulfoxide, methanol, ethanol, and the like, yields an anhydrous or solvated product. Solvated cephalexin cannot be used in human therapy because of the presence of extraneous organic matter in the form of the solvent molecules. However, the solvent can be removed by a simple drying step to give anhydrous cephalexin. This anhydrous product is characteristically a small fiber-like crystal which is fluffy and bulky, and hygroscopic in nature. It easily picks up a static charge, and is relatively unstable because of its hygroscopic properties. These characteristics are particularly troublesome in preparing the compound for pharmaceutical uses. The charged particles repel one another and tend to be flyaway when being weighed and when being filled into capsules. The water absorbed because of the material's hygroscopicity, although tending to neutralize the static charge, causes the crystals to change weight and to make accurate weighing difficult.

Precipitation of cephalexin from aqueous solutions at normal room temperatures results in cephalexin dihydrate crystals which are fluffy, bulky, and difficult to handle. The dihydrate readily converts to a monohydrate on drying, but the monohydrate so formed is a fluffy, crystalline material having a density of 0.30 to 0.40 g./ml. It becomes flyaway on handling and is difficult to fill into bottles and capsules. In short, cephalexin monohydrate obtained in this manner is not well suited for pharmaceutical uses.

Thus, the physical forms of cephalexin known heretofore exhibit characteristics which are undesirable in a drug. Such characteristics make pharmaceutical compounding of the drug a difficult and troublesome task. Therefore, a form of cephalexin more amenable to pharmaceutical uses is needed.

SUMMARY OF THE INVENTION

I have now discovered a novel dense, stable, nonhygroscopic, crystalline cephalexin monohydrate having desirable handling characteristics. This crystalline cephalexin monohydrate is obtained by precipitation from an aqueous solution of an acid addition salt of cephalexin by the addition of a base at a temperature of about 60° C. or above, or by spraying anhydrous cephalexin with excess water and drying the resulting hydrous material to constant weight. Its properties are those sought in a pharmaceutical product.

DESCRIPTION OF THE PREFERRED EMBODIMENT

The novel crystalline form of cephalexin monohydrate described and claimed herein has the following unique X-ray diffraction properties at λ=1.5405 using a Cu:Ni 45 kv. 20 ma. radiation source.

| Spacing $d$: | Relative intensities $I/I_1$ |
|---|---|
| 15.15 | .40 |
| 11.85 | 1.00 |
| 11.00 | .30 |
| 9.36 | .20 |
| 8.55 | .50 |
| 7.86 | .50 |
| 6.89 | .20 |
| 5.98 | .40 |

| Spacing d: | Relative intensities $I/I_1$ |
|---|---|
| 5.39 | 1.00 |
| 4.97 | .50 |
| 4.76 | .40 |
| 4.57 | .40 |
| 4.39 | .60 |
| 4.22 | .60 |
| 4.00 | .70 |
| 3.86 | .70 |
| 3.60 | .80 |
| 3.46 | .30 |
| 3.24 | .60 |
| 3.10 | .60 |
| 2.98 | .40 |
| 2.90 | .60 |
| 2.81 | .40 |
| 2.73 | .20 |
| 2.68 | .40 |
| 2.63 | .10 |
| 2.47 | .30 |
| 2.41 | .15 |
| 2.31 | .30 |
| 2.25 | .30 |
| 2.12 | .10 |
| 2.09 | .05 |
| 2.01 | .02 |
| 1.93 | .05 |
| 1.87 | .05 |
| 1.85 | .05 |
| 1.82 | .10 |
| 1.72 | .05 |
| 1.66 | .02 |
| 1.62 | .02 |

The crystals are large in form, extremely dense, non-hygroscopic, and do not pick up a static charge. The term "dense" means having a density above about 0.45 g./ml., preferably within the range of 0.50 to 0.60 g./ml. These characteristics lend themselves to pharmaceutical formulating operations.

In addition to having characteristics which make possible its use directly in formulating operations, the crystalline monohydrate can be vacuum dried at elevated temperatures, as for example at 60° C. or above, to yield an anhydrous powder with the same crystalline form and advantageous properties possessed by the monohydrate. The new form of crystalline anhydrous cephalexin is also suitable for the formulation of pharmaceutical compositions containing cephalexin.

The novel crystalline composition of this invention can be obtained from cephalexin, or from any acid addition salt thereof, as for example the hydrochloride, sulfate, nitrate, phosphate, or hydrobromide salt by (1) suspending the antibiotic or a salt thereof in an aqueous medium, (2) adding a strong acid in sufficient quantity to dissolve the suspended antibiotic, (3) raising the temperature of the solution to above about 60° C., (4) precipitating the antibiotic therefrom by the addition of a base, and (5) removing the crystalline antibiotic by filtration, decantation or the like.

Interestingly, if the above procedure is followed except that the precipitation is conducted at a temperature below about 60° C. cephalexin dihydrate is obtained. This dihydrate is a fluffy, difficult to handle, crystalline material. It can be converted to a monohydrate by controlled vacuum drying to remove one mole of water. This monohydrate is undesirable because it is a fluffy material having a density of 0.30 to 0.40 g./ml. It also becomes flyaway and is difficult to fill into bottles and capsules.

In an alternative preparation of the desired crystalline monohydrate, cephalexin is placed in a large rotating vessel and about 30 to about 50 percent by weight of water added, suitably by spraying. This amount of water is insufficient to form an appreciable aqueous phase or to produce a slurry. The mixture is allowed to tumble in the rotating vessel and is then subjected to vacuum drying to about 4 to 8 percent water content.

The preparation of my crystalline cephalexin monohydrate will be illustrated by the following examples.

EXAMPLE 1

Cephalexin (15 g.) is suspended in 100 ml. of water at room temperature. Concentrated hydrochloric acid is added dropwise in an amount just sufficient to dissolve the antibiotic (90–100 drops). The resulting solution has a pH of 1.8–1.9. The solution is heated to about 60° C. by immersion in a steam bath. When the required temperature has been reached, concentrated ammonium hydroxide is added fairly rapidly with stirring until a pH of 4.3 has been attained. Near the end of or just after the addition of ammonium hydroxide crystals begin to precipitate. When precipitation is complete the mixture is cooled, and the precipitate is isolated by filtration and washed with a small amount of water to remove any coprecipitated ammonium chloride. X-ray analysis shows the product to be cephalexin monohydrate. The density of the crystalline material is 0.50 g./ml.

EXAMPLE 2

The procedure of Example 1 is followed except that the antibiotic is first suspended in water at a temperature of 65° C. and the acid is added to effect dissolution.

EXAMPLE 3

The procedure of Example 2 is followed except that glacial acetic acid is used to dissolve the suspended cephalexin.

EXAMPLE 4

Cephalexin (17.43 kg.) is placed in a Devine rotary jacketed drier and recirculatory water at 20° C. is passed through the jacket during the hydration procedure. Deionized water (6.97 l.) is added as a fine spray from a pressurized vessel over a one hour period while the drier is rotating. The drier is stopped, the interior of the vessel is scraped down, then a vacuum is applied to the drier for two hours. The mixture is allowed to stand at room temperature in the drier for 18 hours. Rotation of the drier is then begun and the temperature of the vessel is raised to 30° C. A vacuum is applied to the vessel for 12 hours until internal pressure of 8 mm. Hg at an internal temperature of 30° C. is attained in the vessel. The sample is ground in a Fitzpatrick mill prior to formulation. The product from this example is identical to that obtained in Examples 1–3.

I claim:

1. Crystalline cephalexin monohydrate exhibiting essentially the following X-ray diffraction data:

| Spacing d: | Relative intensities $I/I_1$ |
|---|---|
| 15.15 | .40 |
| 11.85 | 1.00 |
| 11.00 | .30 |
| 9.36 | .20 |
| 8.55 | .50 |
| 7.86 | .50 |
| 6.89 | .20 |
| 5.98 | .40 |
| 5.39 | 1.00 |
| 4.97 | .50 |
| 4.76 | .40 |
| 4.57 | .40 |
| 4.39 | .60 |
| 4.22 | .60 |
| 4.00 | .70 |
| 3.86 | .70 |
| 3.60 | .80 |
| 3.46 | .30 |
| 3.24 | .60 |
| 3.10 | .60 |

| Spacing $d$ | Relative intensities $I/I_1$ |
|---|---|
| 2.98 | .40 |
| 2.90 | .60 |
| 2.81 | .40 |
| 2.73 | .20 |
| 2.68 | .40 |
| 2.63 | .10 |
| 2.47 | .30 |
| 2.41 | .15 |
| 2.31 | .30 |
| 2.25 | .30 |
| 2.12 | .10 |
| 2.09 | .05 |
| 2.01 | .02 |
| 1.93 | .05 |
| 1.87 | .05 |
| 1.85 | .05 |
| 1.82 | .10 |
| 1.72 | .05 |
| 1.66 | .02 |
| 1.62 | .02 | and being a dense, stable, non-hygroscopic crystal.

2. A crystalline cephalexin monohydrate as in claim 1 having a density within the range of 0.50 to 0.60 g./ml.

References Cited

UNITED STATES PATENTS 3,531,481   9/1970   Pfeiffer _____ 260—243 C

NICHOLAS S. RIZZO, Primary Examiner

U.S. Cl. X.R.

424—246